United States Patent [19]

Shu et al.

[11] Patent Number: 5,358,564
[45] Date of Patent: * Oct. 25, 1994

[54] IN-SITU CEMENTATION FOR PROFILE CONTROL

[75] Inventors: Paul Shu, Cranbury, N.J.; Ricky C. Ng; Craig H. Phelps, both of Dallas, Tex.

[73] Assignee: Mobil Oil Corporation, Fairfax, Va.

[*] Notice: The portion of the term of this patent subsequent to May 18, 2010 has been disclaimed.

[21] Appl. No.: 63,204

[22] Filed: May 18, 1993

Related U.S. Application Data

[62] Division of Ser. No. 810,586, Dec. 19, 1991, Pat. No. 5,211,231.

[51] Int. Cl.$^5$ ............... C04B 12/04; E21B 33/138
[52] U.S. Cl. .................. 106/600; 106/634; 106/638; 106/802; 166/261; 166/270; 166/272; 166/292; 166/293; 405/266; 405/267
[58] Field of Search ........... 106/600, 634, 638, 802; 166/261, 270, 272, 292, 293, 294, 295; 405/266, 267

[56] References Cited

U.S. PATENT DOCUMENTS

| | | | |
|---|---|---|---|
| 2,402,588 | 6/1946 | Andresen | 166/21 |
| 3,645,446 | 2/1972 | Patten | 239/14 |
| 3,805,893 | 4/1974 | Sarem | 166/270 |
| 3,918,521 | 11/1975 | Snavely, Jr. et al. | 166/272 |
| 3,965,986 | 6/1976 | Christopher | 166/292 |
| 4,440,227 | 4/1984 | Holmes | 166/261 |
| 4,479,894 | 10/1984 | Chen et al. | 252/8.55 |
| 4,489,783 | 12/1984 | Shu | 166/272 |
| 4,513,821 | 4/1985 | Shu | 166/273 |
| 4,669,542 | 6/1987 | Venkatesan | 166/258 |
| 4,804,043 | 2/1989 | Shu et al. | 166/263 |
| 4,834,180 | 5/1989 | Shu | 166/270 |
| 5,211,231 | 5/1993 | Shu et al. | 166/261 |

*Primary Examiner*—Anthony Green
*Attorney, Agent, or Firm*—Alexander J. McKillop; George W. Hager, Jr.; Charles A. Malone

[57] ABSTRACT

A method and composition for controlling the profile of a formation where temperatures higher than 200° F. are encountered. An aqueous solution of an organoammonium silicate, alkali metal or ammonium silicate is injected into a zone of higher permeability in a formation. Subsequently, a spacer volume of a water-immiscible organic solvent is directed into said zone. Afterwards, a water-miscible organic solvent containing an alkylpolysilicate is injected into the higher permeability zone. A silica cement is formed in-situ thereby substantially closing the higher permeability zone to fluid flow. Thereafter, a steam-flooding, water-flooding, carbon dioxide-flooding, or fire-flooding EOR operation is commenced in a lower permeability zone.

11 Claims, 1 Drawing Sheet

IN-SITU CEMENTATION FOR PROFILE CONTROL

This is a division of copending application Ser. No. 07/810,586, filed on Dec. 19, 1991 now U.S. Pat. No. 5,211,231.

FIELD OF THE INVENTION

This invention relates to the plugging of a more permeable zone of a subterranean formation. More particularly, the invention relates to a novel method of forming a silica cement in-situ which covers a substantial areal extent of a more permeable zone. This method is especially useful in promoting more uniform fluid injection patterns so as to tolerate neutral or high temperature steam while conducting a steam-flooding, water-flooding, carbon dioxide-flooding, or fire-flooding enhanced oil recovery operation (EOR) in a lesser permeability zone.

BACKGROUND OF THE INVENTION

Steam or fire stimulation recovery techniques are used to increase production from an oil-bearing formation. In steam stimulation techniques, steam is used to heat a section of a formation adjacent to a wellbore so that production rates are increased through lowered oil viscosities.

In a typical conventional steam stimulation injection cycle, steam is injected into a desired section of a reservoir or formation. A shut-in (or soak phase) may follow, in which thermal energy diffuses through the formation. A production phase follows in which oil is produced until oil production rates decrease to an uneconomical amount. Subsequent injection cycles are often used to increase recovery.

Steam stimulation techniques recover oil at rates as high as 80–85% of the original oil in place in zones at which steam contacts the reservoir. However, there are problems in contacting all zones of a formation due to heterogeneities in the reservoir, such as high/low permeability streaks, which may cause steam fingering. When any of these heterogeneities are present in a reservoir, the efficiency of a process begins to deteriorate due to reduced reservoir pressure, reservoir reheating, longer production cycles and reduced oil-steam ratios. As a result, steam stimulation may become unprofitable.

Various methods have been proposed so that steam can be diverted to uncontacted zones of a formation. One such method is disclosed in U.S. Pat. No. 2,402,588 which issued to Andersen. Andersen disclosed a method of filling a more permeable zone of a reservoir by injecting a dilute alkaline solution of sodium silicate under low pressure. An acid gas such as carbon dioxide is then injected to reduce the alkalinity of the solution, which results in the forming of a silica gel.

Another method is disclosed in U.S. Pat. No. 3,645,446 which issued to Young et al. Young discloses the plugging of a zone of a reservoir by injecting a mixture of steam and sodium silicate into the permeable zone. A second mixture containing steam and a gelling agent such as carbon dioxide is injected into the permeable zone and the two mixtures are allowed to react. A hard silica gel plug is formed.

Another method is disclosed in U.S. Pat. No. 3,805,893 which issued to Sarem. Sarem discloses the formation of a gelatinous precipitate by injecting small slugs of a dilute aqueous alkali metal silicate solution, followed by water and then a dilute aqueous solution of a water-soluble material which reacts with the alkali metal silicate to form a precipitate. The precipitate hardens to form a substantially impermeable substance. A water-flooding oil recovery method is then conducted in a lower permeability zone.

Christopher discloses another method in U.S. Pat. No. 3,965,986. In this method, a slug of liquid colloidal silica and water is injected into a reservoir. This slug has a relatively low viscosity. A surfactant is next injected therein which forms a gel on contact with the silica slug.

Amino resins such as melamine formaldehyde resins are cross-linked with certain polymers to make gels useful as profile control agents for high temperature reservoirs during a water-flooding operation. These gels are disclosed in U.S. Pat. No. 4,834,180 which issued to Shu on May 30, 1989. These gels are unable to withstand high temperatures encountered during a fire-flooding enhanced oil recovery operation.

Therefore, what is needed is a method for consolidating a high permeability zone of a formation while controlling the permeability of that zone with a natural silica cementing material so as to enable the conducting of an EOR method such as a steam-flooding, carbon dioxide-flooding, water-flooding or fire-flooding operation in a zone of lesser permeability where high temperatures and pH's of 7.0 or less are encountered.

SUMMARY OF THE INVENTION

This invention is directed to a method for permeability profile control where a steam-flooding, water-flooding, carbon dioxide-flooding, or fire-flooding EOR operation is utilized or where high temperatures and pH's of 7.0 or less are encountered. In the practice of this invention, an aqueous organoammonium silicate, alkali metal or ammonium silicate solution is injected into a higher permeability zone of the formation. The silicate is prevented from entering a zone of lower permeability by utilization of a mechanical packer. As the aqueous organoammonium, alkali metal or ammonium silicate enters the higher permeability zone, it saturates said zone.

Thereafter, a spacer volume of a water-miscible organic solvent is directed into the higher permeability zone. The solvent is selected from a member of the group consisting of methanol, ethanol, higher alcohols, ketones, tetrahydrofuran, and dimethyl sulfoxide.

After the spacer volume of solvent has been placed into the higher permeability zone, a water-miscible organic solvent containing an alkylpolysilicate is next injected into the higher permeability zone. Upon coming into contact with the organoammonium silicate, alkali metal or ammonium silicate solution which has saturated the higher permeability zone, alkylpolysilicate reacts with the organoammonium silicate, alkali metal or ammonium silicate to form a silica cement in-situ. The silica cement which is formed is stable at neutral or low pH's and temperatures in excess of about 200° F. These above steps can be repeated until the zone has been closed or consolidated to the extent desired. Thereafter, a steam stimulation, carbon dioxide, water-flooding, or fire-flooding EOR operation is initiated in a zone of lower permeability in said formation to remove hydrocarbonaceous fluids therefrom.

By controlling the strength and rate of injection of the organoammonium silicate, alkali metal or ammonium silicate and the alkylpolysilicate which are injected into the higher permeability zone, the higher permeability zone of the formation can be closed to fluid flow.

It is therefore an object of this invention to provide for a method of making a silica cement in-situ for controllably plugging or closing a higher permeability zone within a formation which cement is more natural to a formation's environment.

It is even another object of this invention to consolidate a loosely consolidated zone in a formation while controlling the profile of that zone.

It is another object of this invention to provide for a composition which will ensure an even flow front and a homogeneous consolidation when closing a higher permeability zone where neutral and low pH's or high temperatures are encountered.

It is a further object of this invention to provide for a simple process for blocking a zone which tolerates residual oil and formation brine while making a silica cement in-situ while controlling the distribution and setting of said cement.

It is a still yet further object of this invention to provide for a formation profile control method which can be reversed by treating the consolidated interval with an alkali solution.

It is an even still yet further object of this invention to provide for a formation consolidation agent which is resistant to high temperatures and neutral or low pH's.

It is a yet even still further object of this invention to provide for a simple process for closing a higher permeability zone in a formation which avoids complex procedures of clearing and removing water from said zone.

BRIEF DESCRIPTION OF THE PREFERRED EMBODIMENT

Figure 1:
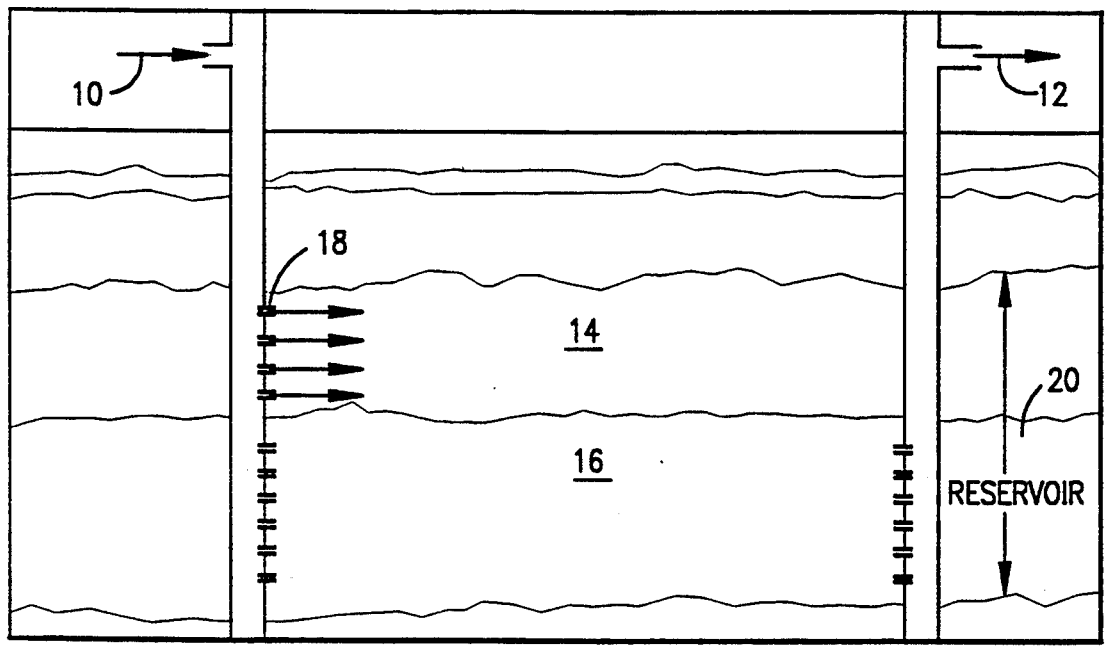
FIG. 1 is a schematic illustration which shows placement of the components of this invention in a higher permeability zone of a formation.

This invention concerns an improvement in the sweep efficiency of an EOR process by injecting sequentially solutions sufficient to form a silica cement in-situ in a higher permeability zone of a formation so as to close an oil-depleted zone. When a need to close the higher permeability zone has been determined, an aqueous solution containing an organoammonium silicate, alkali metal or ammonium silicate is injected into the higher permeability zone. Once the aqueous silicate solution has progressed into the higher permeability zone to the extent desired, a spacer volume of a water-miscible organic solvent is next injected into the higher permeability zone to separate the aqueous silicate slug from an organic solvent containing an alkylpolysilicate.

This spacer volume of solvent is selected from a member of the group consisting of methanol, ethanol, higher alcohols, ketones, tetrahydrofuran, and dimethyl sulfoxide. Solvents used as a spacer volume may be of an industrial grade. Utilization of the spacer volume should be kept to a minimum in order to obtain a higher degree of plugging. If residual permeability is desired the volume of solvent slug should be increased.

After placing the spacer volume of solvent into the higher permeability zone, a solvent containing an alkylpolysilicate is directed into the higher permeability zone. This alkylpolysilicate reacts with the organoammonium silicate, alkali metal or ammonium silicate thereby forming a silica cement in-situ which consolidates and controls permeability in the higher permeability zone. Injection of the organoammonium silicate, alkali metal ammonium silicate, spacer volume of solvent, and alkylpolysilicate can be repeated until the higher permeability zone is consolidated and its permeability reduced to a desired extent.

In order to increase the cement's consolidating and plugging ability, the concentration of the organoammonium silicate, alkali metal silicate or ammonium silicate contained in an aqueous solution or the alkypolysilicate contained in the solvent can be increased. Similarly, the flow rates of each of these solutions through the higher permeability zone can be decreased to obtain better consolidation and plugging strength. A decreased flow rate is particularly beneficial for increasing plugging or consolidation and controlling permeability when the alkylpolysilicate solution's flow rate is decreased. As will be understood by those skilled in the art, optimal concentrations and flow rates are formation dependent. Therefore, optimal concentrations and flow rates should be geared to field conditions and requirements.

Organoammonium silicates which can be used in an aqueous solution include tetraammonium silicate and other alkyl, aryl, or hetero atoms containing moieties such as sulfur or oxygen and ten or less carbon atoms are preferred.

After the higher permeability zone has been consolidated and the permeability reduced to the extent desired, a thermal oil recovery or water-flooding EOR method is initiated into a zone of lesser permeability within the formation and hydrocarbonaceous fluids are removed therefrom. The formations which are plugged and consolidated can include unconsolidated or loosely consolidated ones. Unconsolidated sand formations are also included. While the EOR method is being conducted in the lower permeability zone, temperatures within that zone may exceed about 400° F. This zone may also have a pH of 7 or less. A method for the selective placement of polymer gels for profile control in a thermal oil recovery method is discussed in U.S. Pat. No. 4,804,043 which issued to Shu et al. on Feb. 14, 1989. This patent is hereby incorporated by reference herein.

Steam-flooding processes which can be utilized when employing this profile control method described herein are detailed in U.S. Pat. Nos. 4,489,783 and 3,918,521 which issued to Shu and Snavely, respectively. U.S. Pat. No. 4,479,894 that issued to Chen et al. describes a water-flooding process that can be used herein. Fire-flooding processes which can be utilized herein are disclosed in U.S. Pat. Nos. 4,440,227 and 4,669,542 which issued to Holmes and Venkatesan, respectively. These patents are hereby incorporated by reference herein.

A carbon dioxide EOR process which can be used after consolidating the higher permeability zone is disclosed in U.S. Pat. No. 4,513,821 which issued to W. R. Shu on Apr. 30, 1985. This patent is hereby incorporated by reference herein.

Organoammonium silicate, ammonium or alkali metal silicates having a $SiO_2/M_2O$ molar ratio of about 0.5 to about 4 are suitable for forming an acid stable silica cement. The metal (M) which is utilized herein comprises sodium, potassium, or lithium ions. Sodium and potassium silicate comprise the preferred inorganic silicates. Silicates containing ammonium ions can be used also. Preferably, the $SiO_2/M_2O$ molar ratio is in the range of about 0.5 to about 4 or greater. The concentration of the silicate solution is about 10 to about 60 wt. percent, preferably 20 to about 50 wt. percent. As will be understood by those skilled in the art, the exact concentration should be determined for each application. In general, concentrated silicate solution are more viscous and more effective in plugging or consolidation due to higher contents of solids.

The viscosity of the silicate solution can also determine the extent to which it will enter a higher permeability zone. In those cases where it is not possible to control the viscosity of the silicate solution and preclude entry into a lower permeability zone, a mechanical packer may be used. The silica cement which is formed can withstand pH's less than about 7 and temperatures up to and in excess of about 200° F. The preferred silicates are sodium and potassium. Potassium is preferred over sodium silicate because of its lower viscosity. Fumed silica, colloidal silica, or alkali metal hydroxides can be added to modify the $SiO_2/M_2O$ molar ratio of commercial silicate. Colloidal silicate can be used alone or suspended in the alkali metal silicate as a means of modifying silica content and pH.

Alkylpolysilicate is the hydrolysis-condensation product of alkylorthosilicate according to the reaction equation below:

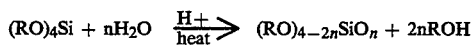

where
$n \leq 2$
$R = C_1 - C_{10}$
R should be $\leq 10$ carbons for good solubility and high $SiO_2$ content.

Tetramethyl or tetraethylorthosilicates (EPS) are preferred. Mixed alkylorthosilicate can also be used. It is desirable to obtain an alkylpolysilicate with $n > 0.5$, preferably greater than about 1. As n increases, the $SiO_2$ content increases, resulting in stronger consolidation. It is desirable to use an alkylpolysilicate with a silica content of 30% or more, preferably about 50% wt. percent. EPS which are used herein are placed into one of the organic solvents mentioned above. The preferred solvent is ethanol. Of course, other alcohols can be used. EPS or other alkylpolysilicates are contained in the solvent in an amount of from about 10 to about 90 weight percent sufficient to react with the silicates contained in the aqueous solution. Although alcohol is the solvent preferred because of its versatility and availability, other water-miscible organic compounds can be utilized. These solvents include methanol and higher alcohols, ketones, tetrahydrofuran, and dimethyl sulfoxide.

Figure 2:
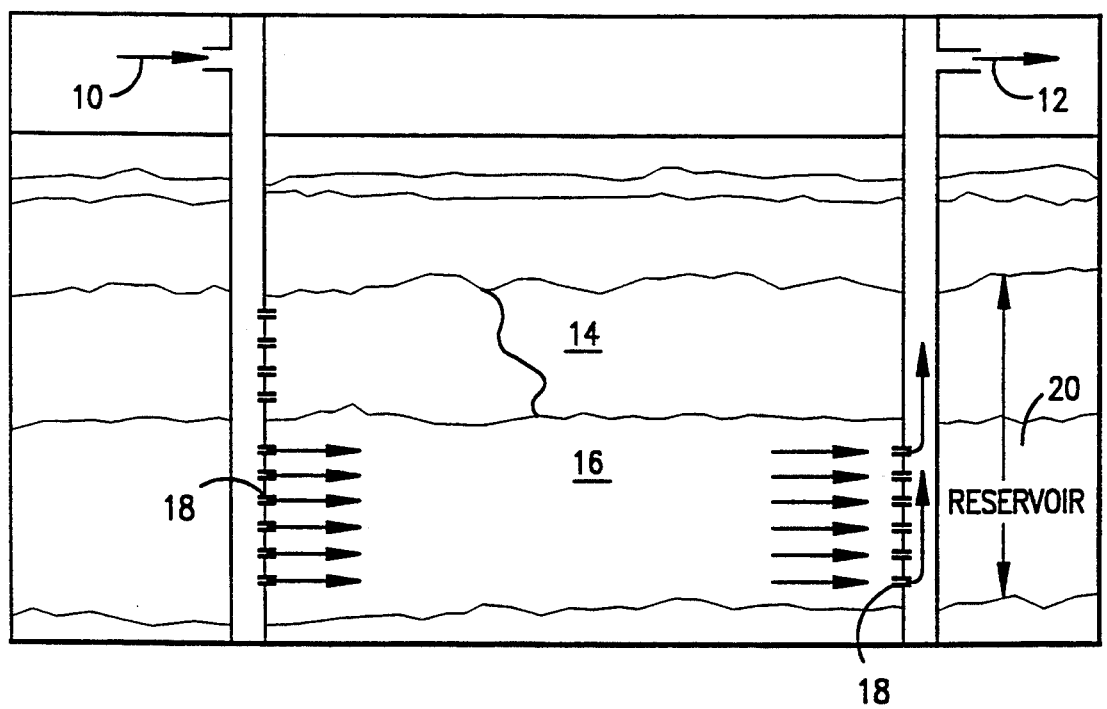
FIG. 2 is a schematic illustration which depicts a higher permeability zone closed with the composition of this invention while an enhanced oil recovery (EOR) method is being initiated in a lower permeability zone.

Referring to FIG. 1, an aqueous solution of an organoammonium silicate, alkali metal or ammonium silicate is injected into injector well where it enters high permeability zone 14 of reservoir 20 through perforations 18. Next a spacer volume of an organic solvent is injected into zone 14. Afterwards, a solvent containing an alkylpolysilicate therein is injected into higher permeability zone 14 where it forms in-situ a silica cement which is stable to temperatures up to and in excess of about 200° F. Once the silica cement has hardened and higher permeability zone 14 has been plugged and consolidated to the extent desired, by repeated applications if necessary, an EOR operation is initiated into lower permeability zone 16 as is shown in FIG. 2. A flooding medium used in the EOR operation exists reservoir 20 by perforations 18 into producer well 12.

As the aqueous organoammonium silicate, alkali metal or ammonium silicate solution proceeds through higher permeability zone 14, it deposits a film of said aqueous silicate on sand grains therein. This aqueous silicate also fills intersitial spaces between the sand grains. A spacer volume of the solvent is directed through zone 14 so as to separate aqueous silicate from the alkylpolysilicate contained in the solvent. The solvent containing the alkylpolysilicate is injected into zone 14 in a concentration and at a rate sufficient to bind and consolidate the sands in zone 14 thereby closing or plugging said zone by forming a silica cement therein.

Although the present invention has been described with preferred embodiments, it is to be understood that modifications and variations may be resorted to without departing from the spirit and scope of this invention, as those skilled in the art readily understand. Such variations and modifications are considered to be within the purview and scope of the appended claims.

What is claimed is:

1. A silica cement sufficient to close a zone of a formation to fluid flow obtained by a process comprising the steps of:
    a) injecting into said zone an aqueous solution of a silicate selected from a member of the group consisting of an alkali metal silicate, ammonium silicate and organoammonium silicate;
    b) injecting next into said zone a spacer volume of a water-miscible organic solvent selected from the group consisting of methanol, ethanol, higher alcohols, ketones, tetrahydrofuran, and dimethyl sulfoxide; and
    c) injecting thereafter into said zone a water-miscible organic solvent containing an alkylpolysilicate in an amount sufficient to react with the silicate solution of step a) when the solutions of steps a) and b) are contacted with a zone of a formation so as to form a silica cement in-situ.

2. The cement as recited in claim 1 where the alkali metal silicate comprises ions of sodium potassium, or lithium, and mixtures thereof.

3. The cement as recited in claim 1 where the alkali metal silicate has a silicon dioxide to metal oxide molar ratio of about 0.5 to about 4.

4. The cement as recited in claim 1 where alkali metal silicate, organoammonium silicate, or ammonium silicate is contained in the solution in an amount of from about 10 to about 60 weight percent.

5. The cement as recited in claim 1 where in step c) the alkylpolysilicate is contained in said solvent in an amount of about 10 to about 90 weight percent.

6. The cement as recited in claim 1 where said silica cement withstands temperatures in excess of 200° F.

7. The cement as recited in claim 1 where the silica cement withstands a temperature in excess of 200° F. and a pH equal to or less than about 7.

8. The cement as recited in claim 1 where the alkali metal silicate has a silicon dioxide to metal oxide molar ratio greater than about 2.

9. The composition as recited in claim 1 where in step c) said alkylpolysilicate is a hydrolysis-condensation product of alkylorthosilicate according to the equation below:
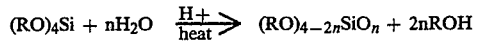
where $n \leq 2$ and $R = C_1 - C_{10}$.
10. The cement as recited in claim 1 where the alkylpolysilicate has a silicon content of at least about 30 wt. percent.
11. The cement as recited in claim 1 where said organoammonium silicate comprises $C_1$ through $C_{10}$ alkyl groups, aryl groups and hetero atom containing moieties.
* * * * *